US008522290B2

(12) United States Patent
Chakrabarti et al.

(10) Patent No.: US 8,522,290 B2
(45) Date of Patent: Aug. 27, 2013

(54) VIDEO ON DEMAND SYSTEM AND METHODS THEREOF

(75) Inventors: Anirban Chakrabarti, West Bengal (IN); Ravi Chandra Nallan, Dist Karimnagar (IN); Subhabrata Bhattacharya, West Bengal (IN)

(73) Assignee: Infosys Technologies, Ltd., Bangalore (IN)

( * ) Notice: Subject to any disclaimer, the term of this patent is extended or adjusted under 35 U.S.C. 154(b) by 1061 days.

(21) Appl. No.: 11/543,888

(22) Filed: Oct. 6, 2006

(65) Prior Publication Data

US 2007/0083617 A1 Apr. 12, 2007

(30) Foreign Application Priority Data

Oct. 7, 2005 (IN) .............................. 1432/CHE/2005

(51) Int. Cl.
*H04N 7/173* (2011.01)
*H04N 7/16* (2011.01)
*G06F 15/16* (2006.01)
*G06F 15/173* (2006.01)

(52) U.S. Cl.
USPC ................. 725/91; 725/86; 725/87; 725/92; 725/96; 725/98; 725/100; 725/103; 725/114; 725/118; 725/119; 725/138; 725/144; 709/201; 709/202; 709/203; 709/218; 709/219; 709/226; 709/249

(58) Field of Classification Search
USPC .......... 725/86–87, 91–92, 96, 98, 100, 103, 725/114, 118–119, 138, 144; 709/201–203, 709/218–219, 226, 249
See application file for complete search history.

(56) References Cited

U.S. PATENT DOCUMENTS

2002/0078174 A1* 6/2002 Sim et al. ..................... 709/219
2002/0133491 A1* 9/2002 Sim et al. ..................... 707/10

OTHER PUBLICATIONS

Iaacson et al., U.S. Appl. No. 60/278,408, filed Mar. 23, 2001 and incorporated by reference into Sim et al. (US Pub No. 2002/0133491).*

* cited by examiner

*Primary Examiner* — Scott Beliveau
*Assistant Examiner* — Yassin Alata
(74) *Attorney, Agent, or Firm* — LeClairRyan, a Professional Corporation

(57) ABSTRACT

A method for transmitting a video data over a grid infrastructure network is disclosed. The method includes receiving a request from at least one user for viewing the video data and identifying a plurality of attributes from a plurality primary grid enabled mini servers (GEMS), wherein the plurality of primary GEMS together form the grid network. The method further includes partitioning video data into a plurality of discrete fragments using a shard creator indicative of the plurality of attributes in each of the plurality of primary GEMS and allocating the plurality of discrete fragments among the plurality of primary GEMS based on the plurality of attributes of each of the plurality of primary GEMS. The method also includes decoding the plurality of discrete fragments of the video data using a streaming server for transmitting the video data to the at least one user.

30 Claims, 7 Drawing Sheets

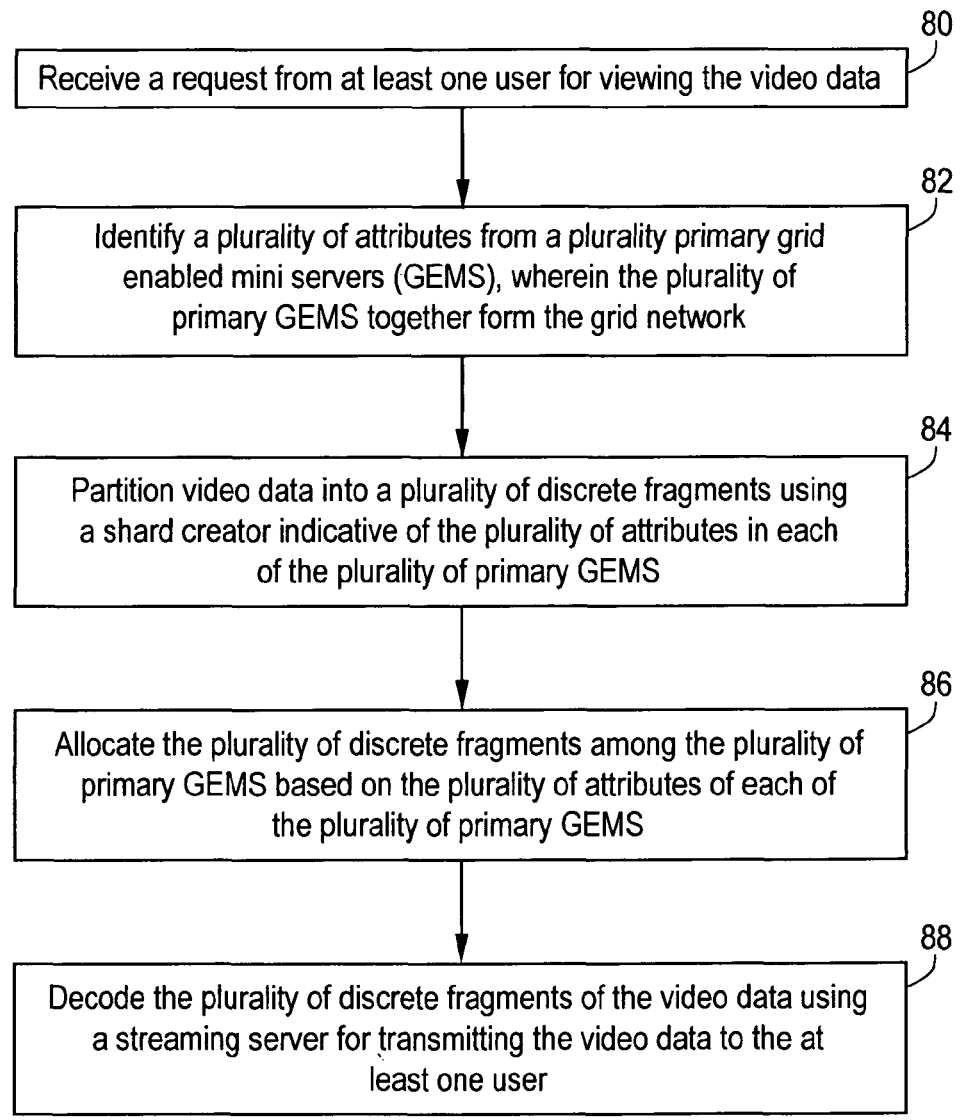

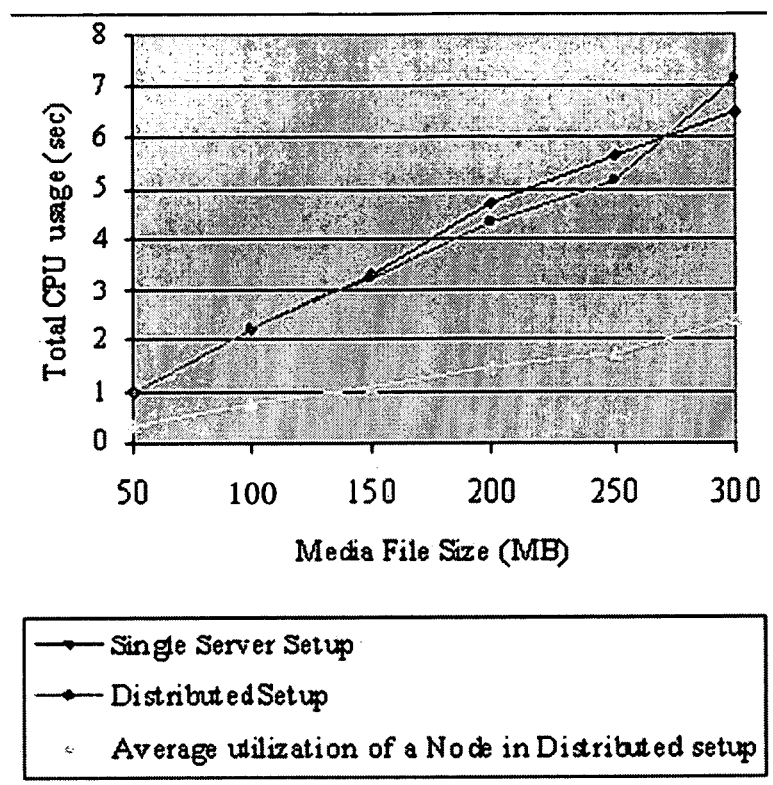
FIG. 7 CPU utilization in Single and Distributed setup

VIDEO ON DEMAND SYSTEM AND METHODS THEREOF

CROSS REFERENCE TO RELATED DOCUMENTS

This application claims priority under 35 U.S.C. §119 to Indian Patent Application Ser. No. 1432/CHE/2005 of Chakrabarti et al., entitled "A Grid Based Approach for Video on Demand Systems," filed Oct. 7, 2005, the entire disclosure of which is hereby incorporated by reference herein.

BACKGROUND OF THE INVENTION

1. Field of the Invention

The invention relates generally to a video on demand (VoD) systems, and more particularly, to a system and method for streaming of video over grid network.

2. Discussion of the Background

The advent of digitization has brought a major shift in paradigm in the context of compression, storage and communication of video data. This has resulted in diversifying usage of digital video across a wide spectrum of application domains. With Internet playing a pivotal role in communication, access to video information has become ubiquitous. Today's scenarios require, conferences to be held and its proceedings to be shared in the form of digitized video across various sites in near-real time, without significant loss of quality. A trivial solution to the above would probably be to distribute the video data through direct download.

However, such a setup has latency overhead as access to the information content may only start once the entire data is downloaded. This leads to the evolution of the concept of streaming, which decomposes a media data into a stream of packets that could be transmitted efficiently over computer networks and on receipt at the client site, may be played without waiting for the complete set of media data. Different video streaming mechanisms take advantage of specialized network protocols like RTSP etc. Multimedia streaming finds its practical implementation in Video on Demand (VoD) systems. These systems incorporate video streaming with complementary technologies enabling subscribers to select videos from a catalog and watch them in near-real-time playback quality unlike the traditional TV broadcast services. Further interactivity like Fast forward, Rewind, Random seek, Pause etc. could also be introduced at the subscriber location to facilitate virtual video playback.

However, such an efficient VoD implementation requires significant computation power, adequate storage and abundant network bandwidth. Recently, research in the high performance community has led to the development of the Grid Computing technologies, where heterogeneous computing and networking infrastructure combine to form a single computing infrastructure. Grid computing provides resource on demand and hence provides a high Return on Investment (ROI), as the resources can be shared as per need.

The various techniques that perform compression on video data encode these data at certain rates (bit-rate). The higher the bit-rate, the better is the quality of the video and the higher the data size. Large data put more constraints on the network bandwidth during transfer. Therefore delivery of video through streaming is largely determined by the availability of network bandwidth. Let us assume a video data has been encoded at a bitrate of $\mu$ kilobits/sec. This data can be played over a network without significant loss of quality, provided the network may furnish consistent bandwidth $\beta$, over a period of time t, is $\beta t \geq \mu t + p$ where p is the transmission payload. Best-effort packet networks like the Internet may not provide such consistent bandwidths and hence video may be re-encoded at a rate lesser than the available bandwidth and subsequently transmitted.

In an effort to solve this problem, many VoD systems implement Real-time stream bit rate switching or adaptive streaming, which adjust streaming according to the availability of network bandwidth. Such an order of adaptation to network bandwidth may be achieved either by (a) Video is stored as data pre-encoded in multiple bit-rates and transmitted, subjected to the availability of bandwidth or (b) Video is encoded dynamically according to the changes of bandwidth. Strategy (a) would require a total storage space $S = \sigma n_i \mu_i$ for each video data, where $n_i$ is the number of instances the data is encoded and $\mu_i$ being the different pre-encoding bit-rates.

For a Video on Demand system that needs to cater to N different video requests, the total storage space is at least NS storage units. Since these requests are random, a highly sophisticated and scalable storage system needs to be deployed. Strategy (b) on the other hand involves encoding fragments of a video data at different bit-rates according to the fluctuations in transmission bandwidth and sending them in near-real time. As the number of requests surges, so does the network traffic at the VoD server which drastically strangles the delivery performance unless a highly robust and scalable network backbone is used. Encoding video itself is a compute intensive process and for every switch to a new bit-rate, the system would need to have computing power in the order of several gigaflops/sec. Also efficient management of factors like interrupt load and physical memory is necessary. Setting up hardware that resolves aforementioned issues incur huge installation and maintenance costs.

Accordingly, there is a need for a technique that integrates Grid with the Video-on-Demand systems through the development of Grid Based VoD (referred as GDVoD) system and overcomes the above mentioned limitations of the existing systems.

SUMMARY OF THE INVENTION

In one embodiment of the present technique, a method for transmitting a video data over a grid infrastructure network is disclosed. The method includes receiving a request from at least one user for viewing the video data and identifying a plurality of attributes from a plurality of primary grid enabled mini servers (GEMS), wherein the plurality of primary GEMS form the grid network. The method further includes partitioning video data into a plurality of discrete fragments using a shard creator indicative of the plurality of attributes in each of the plurality of primary GEMS and allocating the plurality of discrete fragments among the plurality of primary GEMS based on the plurality of attributes of each of the plurality of primary GEMS. Furthermore, the method includes decoding the plurality of discrete fragments of the video data using a streaming server for transmitting the video data to the at least one user.

In another embodiment of the present technique, a system for transmitting a video data over a grid infrastructure network is disclosed. The system includes a plurality of primary grid enabled mini servers (GEMS), wherein each of the plurality of GEMS comprising at least one attribute which is an indicative of capacities of the node. The system further includes a shard creator configured for partitioning the video data into a plurality of discrete fragments based on the at least one attribute of any of the plurality of GEMS and a scheduler configured for allocating the plurality of discrete fragments among the plurality of GEMS based on the at least one attribute of each of the plurality of GEMS. Furthermore, the shard catalog may be configured to store information on the allocation of the plurality of discrete fragments among the plurality of primary GEMS and proxy configured to validate and forward request from at least one user to the scheduler and deliver streamed video data received from GEMS, to the at least one user.

In yet another embodiment of the present technique, a method of partitioning a video data into a plurality of discrete fragments for transmitting the video data to at least one user in a grid infrastructure network is disclosed. The method includes identifying capacity and a plurality of configuration parameters for each of a plurality of primary grid enabled mini server (GEMS) and sequentially segregating the video data into the plurality of discrete fragments based on the capacity and the plurality of configuration parameters for each of the plurality of GEMS. The method further includes allocating each of the plurality of discrete fragments among the plurality of primary GEMS until all the plurality of discrete fragments are allocated among the plurality of GEMS or until no suitable plurality of primary GEMS is located and identifying at least one un allotted fragment and distribute the at least one un allotted fragment among the plurality of primary GEMS based on a pre desired ratio until all the plurality of fragments are distributed among the plurality of primary GEMS.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 is a flowchart illustrating a method for transmitting a video data over a grid infrastructure network, in one aspect of the present technique.

FIG. 7 is a graph illustrating in visual form the data collected of experimental results of CPU utilization in single-server and distributed setups.

DETAILED DESCRIPTION OF THE PREFERRED EMBODIMENTS

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

The present invention relates to a Grid based video-on-demand (GDVoD) systems, and more particularly, a system and method for transmitting a video data over a grid infrastructure network.

Figure 1:
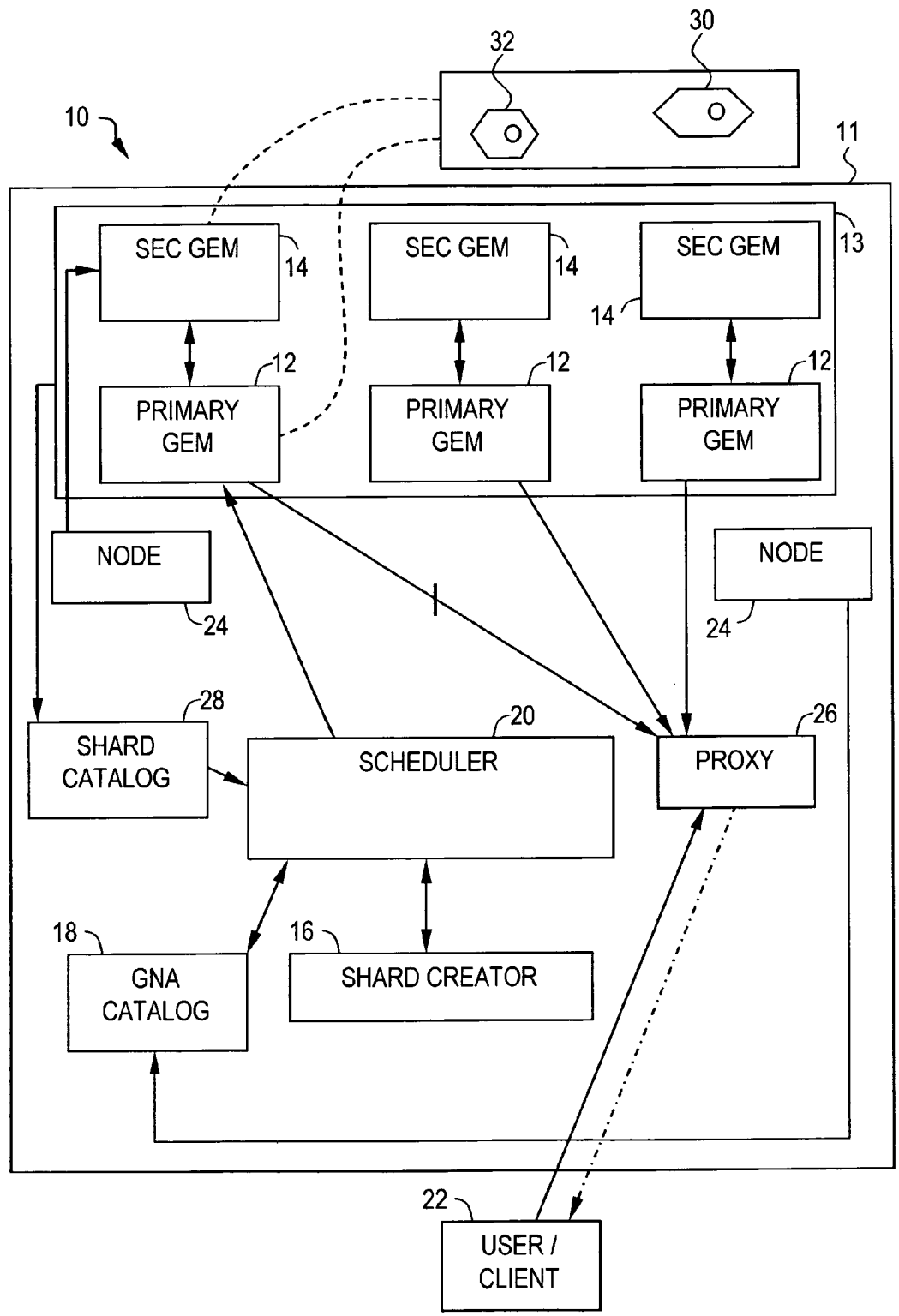
FIG. 1 is a block diagram of a system illustrating a high level architecture for transmitting a video data over a grid infrastructure network, in accordance with an aspect of the present technique.

FIG. 1 is a block diagram of a system 10 illustrating a high level architecture for transmitting a video data over a grid infrastructure network (grid network) 11, in accordance with an aspect of the present technique. Grid network consists of a set of low cost servers (mentioned as Grid enabled mini-servers or GEMS) connected by a network. As illustrated, the system 10 includes multiple primary grid enabled mini-servers (GEMS) 12 for storing a video data and performs various other compute intensive tasks. The system 10 also includes multiple secondary grid enabled mini-servers (GEMS) 14, which facilitates replication of shards across the grid infrastructure network to ensure redundancy for fail-over. In other words, the primary GEMS 12 and the secondary GEMS 14 (together referred as plurality or multiple GEMS 13) are functionally the same but the secondary GEMS may work only during failover or during an overload condition. Furthermore, the system includes a shard creator 16 configured for splitting a particular video data into a number of discrete fragments called shards, a grid node attribute catalog 18 configured for storing information regarding resources pertaining to the grid and the video content stored in the grid infrastructure network and a scheduler 20 configured for scheduling the video delivery process on the various GEMs. In another aspect of the present technique, the shard creator 16 configured for partitioning the video data into a plurality of discrete fragments called shards based on the at least one attribute of any of the plurality of GEMS. Further, the shard creator keeps track of the plurality of GEMS and are updated frequently for examining current capacity of the plurality of GEMS In one aspect of the present technique, system 10 also comprises multiple non-dedicated, inexpensive machines (referred as devices) interconnected with each other through standard network backbone, which form the distributed VoD server responsible for delivering video to the clients or user 22. The machines forms nodes 24 in the Grid infrastructure An user 22 is totally abstracted from the view of the actual Grid nodes 24 that participate in the VoD delivery process. Since storage and processing tasks get distributed, the system may be able to achieve high computation and storage using inexpensive machines resulting in lowering of the total cost of ownership. It should be noted that in certain implementation of the present technique, the plurality of primary GEMS 12 are selected from a plurality of devices or nodes 24 in the grid infrastructure network. As will be appreciated by a person skilled in the art, in certain implementation of the present technique, the video data may also include audio data also.

The system 10 also includes a proxy 26 adapted to validate or authenticate and forward a user's (clients) request to the scheduler and deliver streamed video back to the at least one user (client). It should be noted that the proxy 26 is the single point of contact between the user and the system 10. Any request for a VoD delivery would first arrive at the proxy 26. The proxy 26 is responsible to relay the request to the scheduler (which in turn is based on certain performance metrics and other request specific information as will be explained in details in the sections to follow) and selects a viable set of GEMs from a set of grid nodes 24, which deliver the content of the video data to the user through the proxy.

Further, the system includes a shard catalog 28. The shard catalog 28 contains pieces of information about a video data, its shards and their location. This catalog 28 is consulted by the scheduler 20 to find the most suitable of the options that are available corresponding to a particular request for a video data.

Furthermore, each of the primary GEM 12 and the secondary GEM 14 includes a grid node activity tracker (GNAT) 30 and a streaming server 32. The GNAT 30 may be configured to monitor system usage and perform various other functionalities. Further, GNAT 30 is configured to execute on each of the grid nodes 24 to monitor system usage and perform various other activities. The detail of the other functionalities of GNAT 30 will be explained in further sections to follow. The streaming server is responsible for streaming video from content distributed across the grid.

Figure 2:
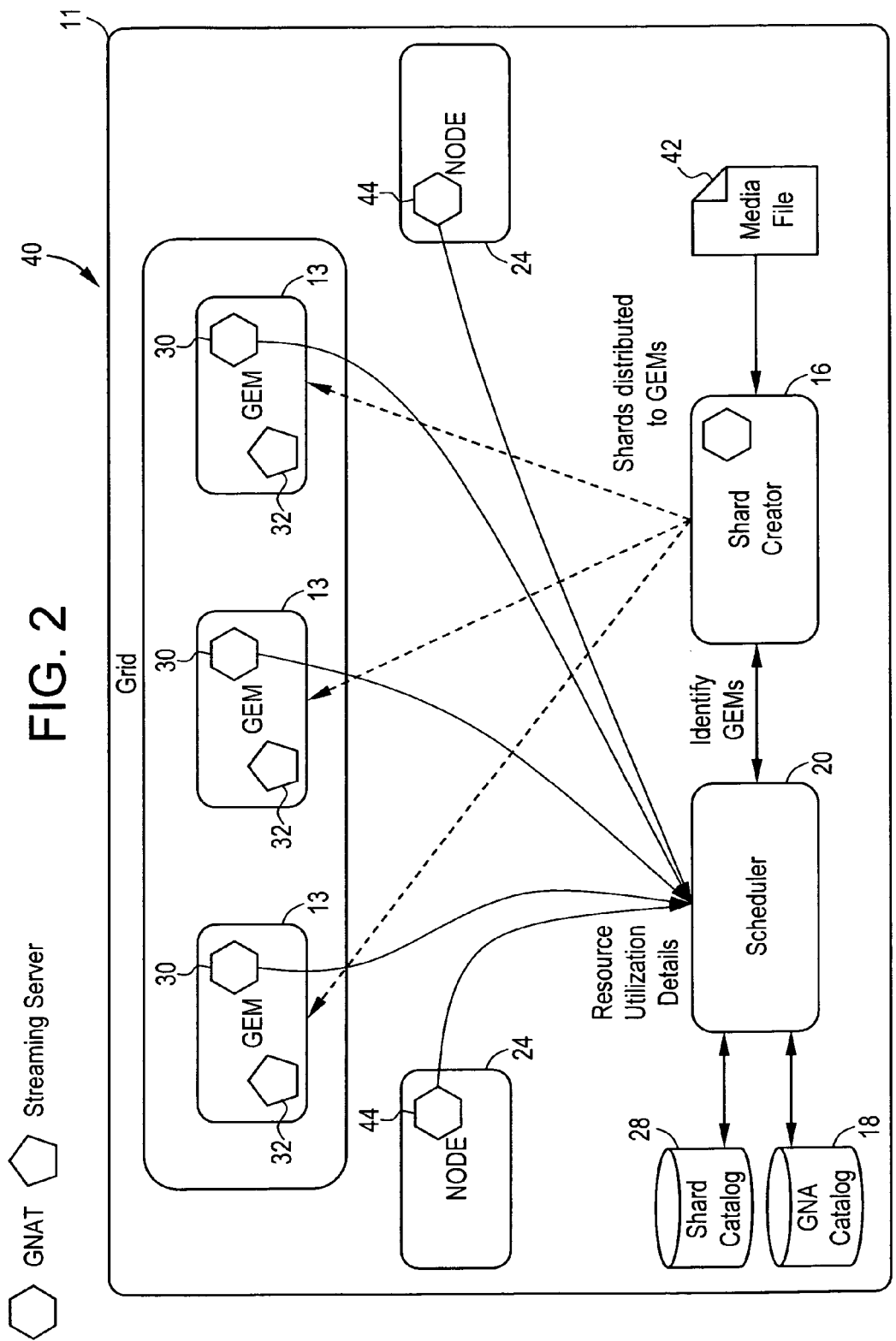
FIG. 2 is a block diagram of a system illustrating initial setup arrangement for transmitting a video data over a grid infrastructure network, in accordance with an aspect of the present technique.

FIG. 2 is a block diagram of a system 40 illustrating initial setup arrangement for transmitting a video data 42 over a grid infrastructure network 11, in accordance with an aspect of the present technique. A Grid Enabled Mini-server or a GEM 13 as explained in FIG. 1 is one of the few selected machines that are primarily responsible for serving video data pertaining to a request. GEMs 13 constituting a typical grid architecture system would need to be in close proximities and preferably be in a localized network to deliver high performance. A video data or media data 42 as illustrated in FIG. 2 is fragmented into a number of shards with the help of a shard creator 16 as will be explained in detail in the sections to follow. These shards are stored across a set of GEMs identified by certain metrics called Grid Node Attributes (GNA). GEMs thus form source for streaming a video data.

Each video data before spreading across the GEMs would need to be identified for the bit-rate and algorithm that has been used to encode the data. The shard creator works in conjunction with the various decoders available for known video data to shred them into a sequence of entities which could not be decomposed further. These entities could be played independently as they retain the information that was used to encode the original video data. A contiguous sequence of these entities is called a shard. The entire process of shard creation needs high computation power and an equally huge storage capacity. A suitable grid node is identified consulting the GNA catalog 18.

The shard creator 16 hence finds its place in the initial setup of the system, where a media data is split into shards and distributed over the Grid. The shard creator 16 works on the basis of the shard distribution algorithm.

The shard distribution algorithm addresses the problem of calculating the size of a shard to be allocated to a grid node 24 in such a way that the cost of streaming that shard is minimal and the resource usage per node is directly proportional to the individual capacities of the node 24.

Shard Creation and Distribution

Let the N contiguous independent entities which need to be accumulated as shard(s) be $e1, e2 \ldots eN$ with size $b1, b2 \ldots bN$ And $B1, B2 \ldots Bm$ be the Bits per Node, Where, $Bi = \text{ceil}(Gci ((\sigma bi \times \Delta)/\sigma Gci))$ It is found that the shards size per node is proportional to the ratio of the capacities $Gci$ to the capacity of that Node and $\Delta$ is a pre-defined constant which adjusts the file size so that the shards get distributed evenly. For all practical purposes $\Delta$ is set to 2.

Algorithm FindShards ( )

1. set i←1
2. set S←0
3. set bN+1 to ∞//sentinel
4. while i<N
5. do
6. Add bi to S,
7. Find the grid node j with the best fit for S, i.e Min(Bj−S) where Bi>S
8. if found j and Bi−S is less than bi+1
then
    set $\hat{E}i$←S
    reduce Bi by $\hat{E}i$
set S←0
    end if
9. increment i by 1
10. done
11. if S>0//some entity's left for distribution
12. then
    increment Bi by (S×Δ/σ Gci)), hence distribute the error.
goto 1
end if A shard can contain a set of m independent entities that store the video/audio information in them. The individual capacity of a node 24 is a value that compares two nodes on the basis of their processing power, storage capacity, memory and other constraints. If it is assumed that the total size of the data as F, then the shard capacity (i.e the max size of shard per node) of each node is a weighted average of the individual capacities on the data size (F). The problem is to fit a maximum sequence of entities onto a node, such that the difference between the total size of the entities and the shard capacity per node is minimal.

The algorithm proceeds in this way,

1. From the first entity in the media data or video data, find the grid node 24 such that the shard capacity is the closest to the size of the entity, and the difference between the entity's size and the shard capacity of the node is not greater than the size of next entity. The idea is to fit the as many continuous entities as the node's shard capacity can take.

2. If no such node can be found, increment the size of next entity by the size of previous entity, and go through step 1 again.

3. If such a node is found, then reset the shard capacity of that node to the difference of the size of the entity and the shard capacity of that node.

4. Iterate through the steps 1-3 until all the entities are allotted or the last entity holds the size of the un-allotted entities and no suitable node can be found.

5. If there is a last entity that holds un-allotted entities is found, then reset the shard capacities of every node to the weighted average of the node capacities on the size of the media data plus the size of last entity (multiplied by a constant), and iterate through steps 1-5, until all the entities are allotted to the grid nodes. The idea here is to distribute the difference between the sizes of allotted entities and the shard capacity of those nodes, according to the individual capacities of the nodes.

The following example shows how this algorithm may be implemented,

Let the set of values b1, b2 ... bN be,

| $b_1$ | $b_2$ | $b_3$ | $b_4$ | $b_5$ | $b_6$ | $b_7$ | $b_8$ | $b_9$ | $b_{10}$ |
|---|---|---|---|---|---|---|---|---|---|
| 10 | 23 | 11 | 19 | 21 | 14 | 12 | 22 | 16 | 9 |
| $b_{11}$ | $b_{12}$ | $b_{13}$ | $b_{14}$ | $b_{15}$ | $b_{16}$ | $b_{17}$ | $b_{18}$ | $b_{19}$ | $b_{20}$ |
| 18 | 20 | 17 | 24 | 35 | 36 | 22 | 27 | 20 | 24 |

The Nodes with capacities (Gci) in the ratio, 20:30:40:60:50, and σ Gci=200

| | | Nodes | | | | | |
|---|---|---|---|---|---|---|---|
| | | 20 | 30 | 40 | 50 | 60 | Error |
| Iteration 1 | Total | 40 | 60 | 80 | 100 | 120 | 24 |
| | Actual ($B_i$) | 35 | 59 | 79 | 98 | 105 | |
| | Sequence | $b_{15}$ | $b_{7-10}$ | $b_{11-14}$ | $b_{1-6}$ | $b_{16-20}$ | |
| Iteration 2 | Total | 42 | 64 | 85 | 106 | 127 | 0 |
| | Actual ($B_i$) | 24 | 63 | 85 | 105 | 123 | |
| | Sequence | $b_{20}$ | $b_{1-4}$ | $b_{5-9}$ | $b_{16-19}$ | $b_{10-15}$ | |

It is obvious that as the iterations increase the utilization of each node 24 is done efficiently (note that the least effective node is used the least, hence using the most effective nodes better). By introducing a weight factor to the left over entity (S) of the loop, one may increase the probability of finding the effective set {Ê1, Ê2 ... Êm} that distributes the load proportionally on the Grid. It can be shown that the algorithm terminates in $\log\Delta S$ iterations where S is the maximum available entity size.

The streaming server 32 is responsible for streaming the video data available to a Node 24. Hence the streaming server 32 would reside on every other GEM to support streaming. In one embodiment, a lightweight open source utility is selected for this called ffserver. The streaming server 32 just needs to stream the shards instead of entire data to the proxy. Since network conditions tend to change unpredictably in grids, streaming needs to be adaptive to the network. The more adaptive is the streaming smoother is the receipt of the video at the client side. The streaming server must have a feedback mechanism through which it can adjust the bit-rates of encoding of the shards. Detecting a set of average network bandwidths, one can pre-encode each shard in constant bit-rates ranging from $\mu 1 < \mu 2 < \mu < \mu 3 < \mu 4$ kilobits/sec where μ being the original encoding bit-rate. Whenever the client's or user's network connectivity declines transmission is switched to a bit-rate lesser than bit-rate transmission was carried out. Similarly if the bandwidth increases, one can switch transmission to a higher bit-rate. The client or user experiences some significant difference in quality which is an acceptable trade off with a smoother delivery of streams. This technique requires a greater storage space and is perfectly suited for a grid environment.

Dynamic or On-the-Fly Encoding is another alternative to pre-encoded streams wherein media is encoded on the fly depending on the clients bandwidth requirements. Since encoding needs to be done in near-real time latency huge amount of computation power is needed and this demands a lot more than trite commodity hardware.

The requirements for the present technique help one to identify Grid Node Attributes (GNA). Some of the attributes are (a) Computation efficiency (Ec), calculated in terms of the processor's architecture, class and clock speed (b) Compute Load (Lc), The current computation workload on the node (c) Available Physical Memory (Am), estimated from the amount of physical memory available for user space processes (d) Available Storage (As) to be used for storing video data and (e) Network Load (Ln), measured in terms of active network connections and rate of data transfer that is currently taking place.

The GNA catalog 18 keeps updated information about the GNA corresponding to all the grid nodes. A Grid Node Activity Tracker 44 installed in each of these nodes in grid facilitates this work. This catalog is consulted whenever a decision related to performance need to be taken. In one embodiment of the present technique, the GNA catalog further helps the scheduler to decide on probable plurality of primary GEMS 13, which would be required in transmitting the video data requested by the at least one user.

Another catalog known as the shard catalog 28 as mentioned in the earlier section contains pieces of information about a video data, its shards and their location. This catalog 28 is consulted by the scheduler 20 to find the most suitable of the options that are available corresponding to a particular request for a video.

As explained earlier, it should be noted that every node in the Grid has a tiny software agent called GNAT 30 installed. A GNAT agent is instantiated with the system start-up and use minimal system resources. Each GNAT 30 has a predefined set of objectives that it performs at specified periodic intervals. However, depending on resource usage, it could be configured to temporarily suspend its activities to prevent starvation of other high priority processes and resume whenever there is sufficient resource availability. The GNAT 30 mandates can be enlisted as Resource Monitoring: A GNAT continuously monitors the grid node on which it is executed and determines the GNAs corresponding to the grid node.

Shard Management: GNAs extracted from each Grid node provide excellent insight to (a) Select a grid node capable of decomposing a video data into shards and (b) Distribute shards across a set of GEMs. A GNAT resident on the target GEMs thus receives shards from the shard creator and places these to suitable locations in target GEMs.

Catalog Maintenance: The GNATs are also responsible in maintaining a catalog that contains information about the shards. Each GNAT communicates a tuple T {$video_{13}$identifier, $shard_{13}$sequence, $GEM_{13}$identifier} to a public Tuple-space. The scheduler consults this Tuple-space based catalog to initiate the VoD delivery process. In one embodiment of the present technique, the GNAT is further adapted to monitor dynamic attributes of the plurality of primary GEMS.

Replication Initiation: GNATs also initiate the process of replication.

GEM Synchronization: Another necessary piece of work done by the GNAT is to facilitate seamless streamed data transfer to the proxy. After a GEM finishes transfer of its data to the proxy, it signals the next GEM to initiate its share of transfer. This synchronization ensures a unified data flow to the client.

Figure 3:
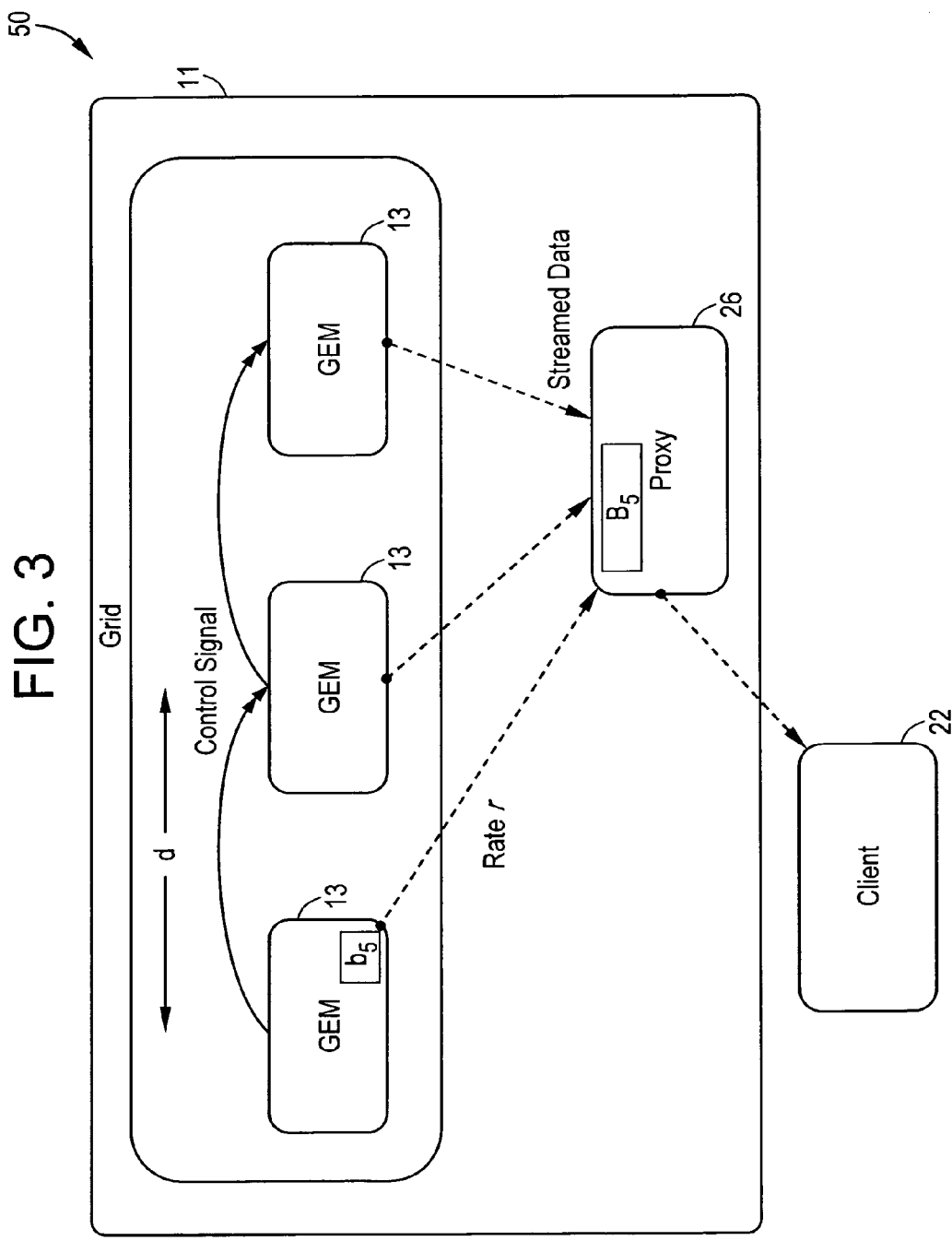
FIG. 3 is a block diagram of a system illustrating synchronization between grid enabled mini servers (GEMS) of FIG. 1, in accordance with an aspect of the present technique.

FIG. 3 is a block diagram of a system 50 illustrating synchronization between grid enabled mini servers (GEMS) of FIG. 1, in accordance with an aspect of the present technique.

Optimized Synchronization Problem

Let us assume that a set of GEMs {G1, G2, G3} are serving a client request. G1 is about to finish its transmission and hence it needs to intimate G2 to start its transmission as soon as G1 has finished. Our goal is to find the time at which G1 would send the intimation signal to G2 so that the client would experience least transition gap.

Supposing BS: size of the pre-roll buffer, which stores streamed video content before playback starts, bS: total size of streamed data left to be sent to the buffer by G1, r: rate of data transmission from G1 to the pre-roll buffer and d: Time taken to send a packet between any two GEMs. To state in words, the time taken to send bS amount of data equals to sum of the time taken to send the intimation signal and time taken for the first frame to arrive at the pre-roll buffer.

Let BS be the size of the pre-roll buffer [20] which stores streamed video content before playback starts, bS be the total size of streamed data left to be sent to the buffer by G1, r be the rate of data transmission from G1 to the preroll buffer and d be the time taken to send a packet between any two GEMs. then, $$bS/r = d + 1/r,$$

$$bS = rd + 1$$

Introducing $\partial$ as a degree of randomness in the rate of transmission, one gets $$bS = rd + 1 + \partial$$

Hence data sent to pre-roll buffer before the intimation signal is, $$BS - (rd + 1 + \partial)$$

So time elapsed(ti) before a GEM sends an intimation signal to the following GEM to start transmission is given by $$ti = [BS - (rd + 1 + \partial)]/r$$

Whenever a request for a video data arrives at the scheduler 20, it firstly determines the locations which contain the shards of the requested video data. The shard catalog 28 helps the scheduler 20 decide on the probable GEMs which would be required in the entire delivery process. In case there are multiple grid nodes 24 available that contain the same shards, preference is given to the ones that outperform the others in terms of the GNA LN as explained in earlier sections.

The scheduler being a normal grid node too has some storage space which could be configured for local caching. Certain video data shards that have the maximum demand over the others could be cached at the scheduler. There are a couple of advantages to have a facility like this (a) It eliminates the cost of streaming from multiple locations, (b) Reduces latency in delivering video content to the client through the proxy. In one aspect of the present technique, the scheduler further comprising caching the plurality of discrete fragments which are frequently used by the at least one user.

Since the scheduler 20 performs a very crucial piece of work it needs to be always alive in order to process the requests received. It needs to be fault tolerant, highly scalable in terms of handling requests and highly available.

In certain implementation of the present technique, the system 50 further aids in facilitating redundancy and content mirroring across the plurality of primary GEMS 12 in the grid infrastructure network using a replicator (not shown for clarity).

The proxy 26 is the one and only point of contact for the user or client 22. The client 22 only needs to request for a video data to the proxy 26 and rest of the processes are taken care by itself. It gives an impression to the client 22 that video data is delivered from one source. As the proxy 26 is the single point of contact between the present system and the clients 22 it could provide an efficient administrative tool to authenticate a client. Several policy related issues could be sorted out at this layer.

Once a request is validated, the proxy 26 relays this to the scheduler 20 which then starts processing it. Since the proxy 26 receives more than the number of requests the scheduler 20 receives, it needs to be highly robust and scalable. Fault tolerance and high availability are other key desirable characteristics of the proxy 26.

It would also need to provide a buffer to store the incoming streams from the GEMs. In case there is a temporary network outage between the client and the proxy, such a mechanism makes sure that content is not re-streamed.

Placing the proxy 26 in the grid is an interesting issue in itself. While designing the present system, there may be at least three options in this regard.

(a) The simplest and the easiest of the three emphasizes on implementing a proxy per client. This nearly eliminates the transmission delay incurred while forwarding streamed content received at the proxy's buffer to the streaming client's pre-roll buffer. The client's buffer needs to be substantially large in order to avoid overflow.

(b) Another design suggests placing the proxy as an edge on the grid. This way many clients can access the same proxy and multiple proxies could be setup to server a group of clients. This architecture is highly reliable and scalable. Furthermore, the client doesn't need to have a significant pre-roll buffer size. However, this could increase latency in receiving pre-roll buffer data.

(c) The last design advocates placing the proxy as a part of the grid. The proxy behaves as a conventional server to the client request. A proxy with sufficient redundancy and failover mechanism can serve many clients.

A portion of a video data or the entire data often experiences larger number of access requests than other portions of the same data or other data. Thus there is a need to guarantee availability of such a system. High availability of a particular video data or its shards could be ensured with sufficient redundancy systems. There are certain methods that are used to identify the media that is in demand. Most of these do so by tracking the number of requests for a particular media. Here it is proposed to introduce a replicator to facilitate redundancy or content mirroring across the various nodes in the grid. The granularity of replication is at portion level rather than data level. This provides more flexibility in replication.

As discussed earlier, initially shards are distributed among the GEMs and the grid has only single instance of these shards. The GEMs to contain these shards are designated as primaries. The process of replication is initiated under the following circumstances:

(a) Scheduler, being the only processor of all valid requests for videos, becomes aware of all the videos that have maximum demand [x]. Hence it intimates the respective GEMs associated with the video under consideration, to create replicas of the same video shards on various other GEMs.

(b) A primary experiences enormous load on itself while serving the clients and needs to back itself up before it breaks down.

In both these cases, it is the respective GNAT's responsibility to accomplish the replication process.

GNATs consult with the GNA catalog 18 to find a suitable GEM 13 for replication. Once a suitable GEM 13 is located the primary's respective contents are transferred. The GNAT listening on the receiving GEM ensures that the contents are placed properly in the local data-system. Thus secondary GEMs are created which in conjunction with the primary GEM constitute a GEM group. Every node in this group communicates with each other GEM and hence follows a heartbeat protocol. This mechanism ensures availability of streamed content if a primary goes down. It also helps in distributing the load when the primary is overwhelmed by large number of requests.

Figure 4:
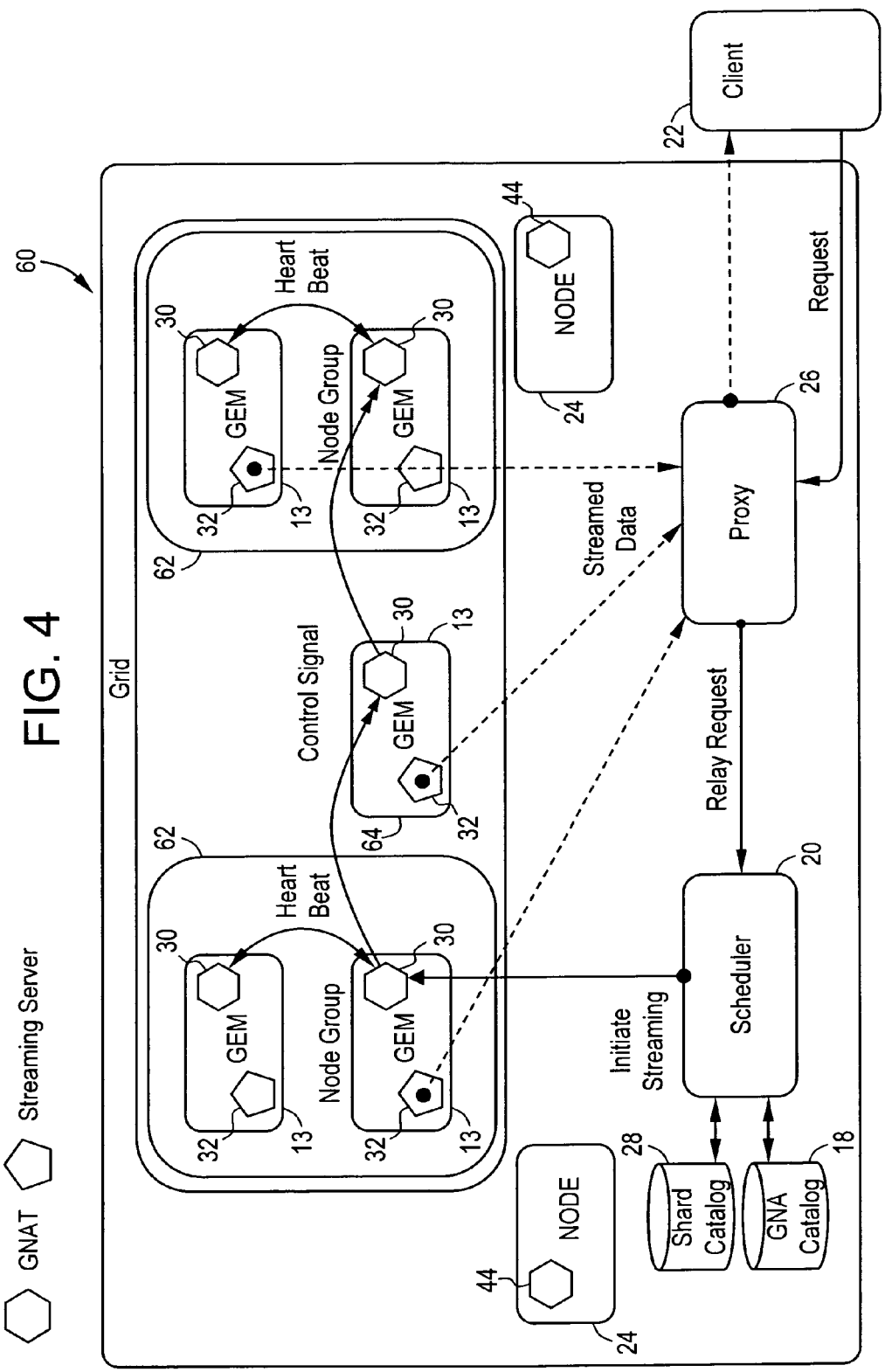
FIG. 4 is a block diagram illustrating working of the system of FIG. 1, in accordance with an aspect of the present technique.

FIG. 4 is a block diagram illustrating working of the system 60 of FIG. 1, in accordance with an aspect of the present technique. As illustrated, the figure shows how replication guarantees high availability. The GEM's in a Node Group 62 have the same shard; hence form the replicated nodes of the GEM.

In one embodiment of the present technique, the flow may be described as,

Step I. Client requests the proxy for a media data or video data

Step II. The request is relayed to the scheduler 20

Step III. The scheduler 20 uses the Shard catalog 28 to find the GEMs 13 which can stream the requested video data.

Step IV. The scheduler 20 then initiates the streaming process by sending a request to the GEM with the first shard.

Step V. Synchronization between the GEM's
  (a) The GEM receives the request and starts streaming the shard it contains
  (b) After calculating the delay, the GNAT on the GEM sends a control signal to next GEM, as notification for starting its stream.
  (c) The Next GEM takes over and the loop continues till all the GEMs are finished with.

Step VI. The proxy 26 receives the streamed content from the GEMs and forwards it to the client 22.

Step VII. The streaming client s/w 22 on the client plays the stream as it comes.

The initial delay before the proxy 26 forwards the stream to client 22 is directly proportional to the delay between the GEMs 13 stream transmission. Hence the buffer at the proxy 26 is proportional to the delay between the successive transmissions. A method for calculating the delay effectively is explained in the earlier sections.

Experimental Setup

One of the experiments carried out in a miniature grid environment consists of three independent machines serving as the GEMs 13. One of the GEM executes the scheduler and the proxy along with the streaming server. A separate machine or node 64 located close to the proxy is configured to be the streaming client.

The performance is benchmarked against a single machine hosting the streaming server and a separate client. All tests are being carried out machines based on variants of Intel x86 processor hardware (Pentium 4 at 2.4 GHz/Pentium III at 733 MHz etc). These run different flavors of desktop Linux operating system configured with GNU/Linux 2.4.x Kernel. While conducting the tests, the machines were allowed to execute normal desktop applications simultaneously to replicate a non-dedicated environment as observed in Grid systems.

Multimedia data, in the form of ac3/a52 encoded, 128 kbps audio streams and rv10 encoded, VBR video streams, are wrapped in RealMedia container data format. The video stream of the media data has a resolution of 640×480 at 25 frames per second.

Ffmpeg is used currently because of its support for a wide range of codecs. Data of sizes starting from 50 MB to 300 M (in the order 50, 100, 150 . . . ) are created out of a regular multimedia data, precisely following the methods as described in the previous paragraph. Three shards of each data are created and relocated to a set of three GEMs. The streaming process is started and information pertaining to various parameters specific to each GEMs, like CPU time, Network bandwidth usage and latency involved during request processing are observed.

Mplayer is used as a client for the streaming servers because of its wide acceptance in the multimedia community.

For each run, every machine is allowed to perform in a steady state (ie. cases involving excessive load on the system in terms of memory, CPU, network traffic, are not taken under consideration). It is to be noted that all the streaming operations are done over HTTP (pseudo-streaming) since current implementations of the software do not have full support for true streaming protocols like RTSP and RTCP. Our prototype can exploit the services offered by these protocols once these are fully implemented.

Experimental Results

CPU: The cpu utilization is measured in terms of the number of seconds CPU spends while executing the streaming server process in user-mode and kernel mode. The observations in both cases (single and distributed streaming server) are tabulated as below in Table 1 and 2 respectively.

TABLE 1

CPU time spent in non-distributed streaming server

| File Size (in MB) | CPU Usage (Real + User) |
|---|---|
| 50 | 00.95 |
| 100 | 02.19 |
| 150 | 03.32 |
| 200 | 04.72 |
| 250 | 05.62 |
| 300 | 06.47 |

TABLE 2

Total CPU time spent in distributed streaming server

| File Size (MB) | CPU Usage (Real + User) (sec) | | | Avg. usage (sec) | Efficiency |
|---|---|---|---|---|---|
| 50 | 00.29 | 00.34 | 00.37 | 00.33 | 2.85 |
| 100 | 00.75 | 00.78 | 00.68 | 00.73 | 2.97 |
| 150 | 00.97 | 01.03 | 01.22 | 01.07 | 3.09 |
| 200 | 01.25 | 01.56 | 01.53 | 01.44 | 3.26 |
| 250 | 01.69 | 01.86 | 01.59 | 01.71 | 3.28 |
| 300 | 02.25 | 02.52 | 02.36 | 02.37 | 2.72 |

The average CPU usage in case of the distributed setup, is almost one third of the non-distributed counterpart. Efficiency of the former over the latter is computed by taking simple ratio of the per-CPU usages. This small scale experiment reveals an important trend in terms of the efficiency of the entire system. The efficiency increases almost linearly with the data-size, however after reaching a threshold, it drops. However, it is inferred from further experimental insight that the efficiency could be increased if the streaming servers are increased too.

FIG. 7 depicts the results of Tables 1 and Table 2 as a graph.

Network Bandwidth: The network bandwidth used by each system is measured in terms of the number of network packets being transmitted by each of the components. Since packets are routed in a double-hop fashion (from the streaming server to the proxy, from the proxy to the client), TCP connection overhead becomes twofold. It should be noted that this overhead could however be reduced if lighter protocols are used.

By splitting each data into three shards and relocating them in three different GEMs lessens the number of packets transmitted by a single machine. Hence, network bandwidth consumed by a single machine diminishes by a factor close to 3.

Overall request processing latency: the present technique introduces an overhead in terms of processing a particular request for a media data. There are certain instances when an overhead is introduced which could be explained as follows:
a) Proxy forwarding client's request to scheduler
b) Scheduler forwarding request to appropriate GEM hosting the streaming server
c) Proxy forwarding streamed data to client.

There is an overhead of 10-15% which is the time required for connection setup between the scheduler and the first GEM, and will be amortized as the connections increase. An average overhead of 4% is observed which accounts for the thread creation and synchronization between the threads.

Figure 5:
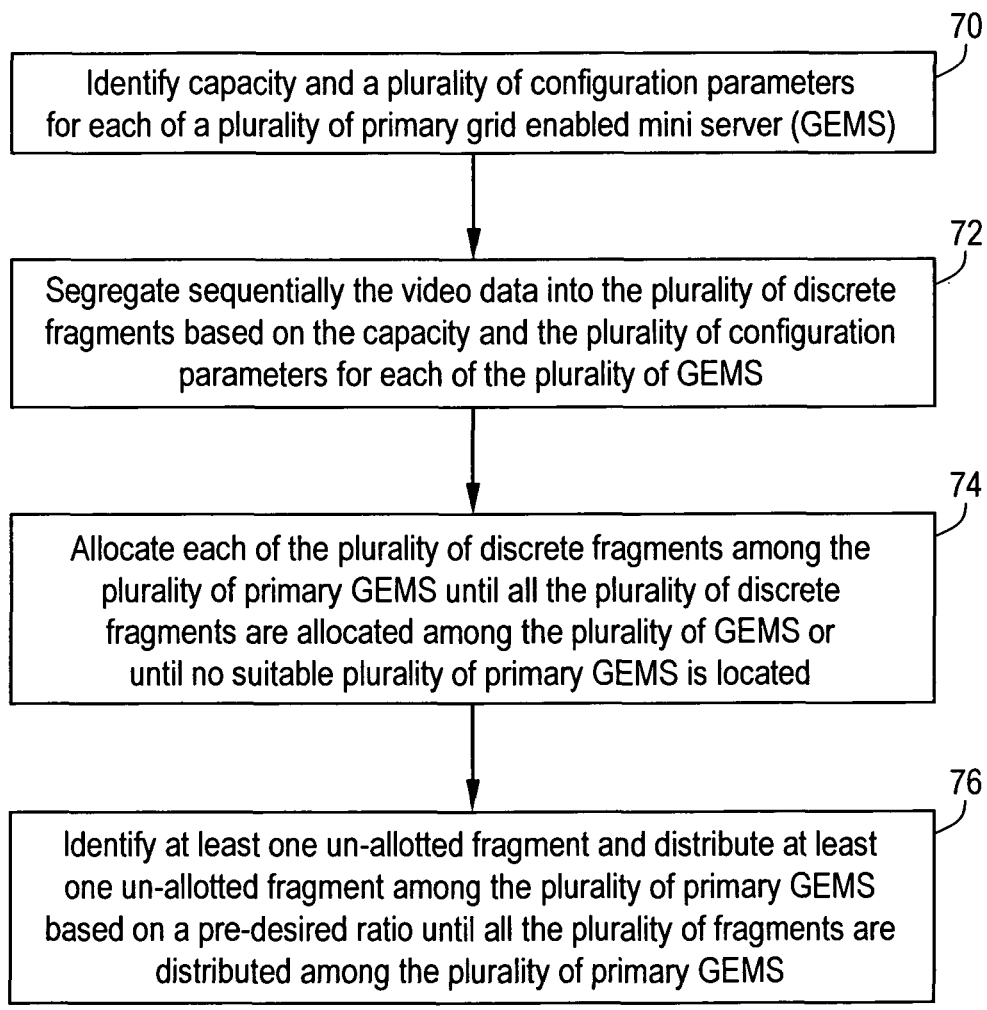
FIG. 5 is a flow diagram illustrating a method of transmitting a video data over a grid infrastructure network, in accordance with an aspect of the present technique.

FIG. 5 is a flowchart illustrating a method of partitioning a video data into a plurality of discrete fragments for transmitting the video data to at least one user in a grid infrastructure network, in one embodiment of the present technique. The method starts in step 70 by identifying capacity and a plurality of configuration parameters for each of a plurality of primary grid enabled mini server (GEMS). In one embodiment of the present technique, it should be noted that each of the plurality of discrete fragments is allocated in any of the plurality of primary GEMS based on the capacity and the plurality of configuration parameters. It should also be noted that the video data is segregated by matching overall size of video data proportional to the ratio of the capacities of the plurality of primary GEMS.

Step 72 comprises of sequentially segregating the video data into the plurality of discrete fragments based on the capacity and the plurality of configuration parameters for each of the plurality of GEMS. Step 74 comprises of allocating each of the plurality of discrete fragments among the plurality of primary GEMS until all the plurality of discrete fragments are allocated among the plurality of GEMS or until no suitable plurality of primary GEMS is located.

Step 76 comprises of identifying at least one un allotted fragment and distribute the at least one un allotted fragment among the plurality of primary GEMS based on a pre desired ratio until all the plurality of fragments are distributed among the plurality of primary GEMS.

In certain implementation of the present technique, the method further includes adding a weight factor to the at least one un allotted fragment for determining an affective set that distributes proportionally the plurality of fragments among the plurality of primary GEMS.

FIG. 6 is a flowchart illustrating a method for transmitting a video data over a grid infrastructure network, in one aspect of the present technique. The method starts in step 80 by receiving a request from at least one user for viewing the video data. The method continues in step 82 by identifying a plurality of attributes from a plurality of primary grid enabled mini servers (GEMS), wherein the plurality of primary GEMS together form the grid network. The method continues in step 84 by partitioning video data into a plurality of discrete fragments using a shard creator indicative of the plurality of attributes in each of the plurality of primary GEMS. It should be noted that the partitioning of video data into the plurality of discrete fragments depends on encoding algorithm and corresponding bit rate.

In step 86, the plurality of discrete fragments are allocated among the plurality of primary GEMS based on the plurality of attributes of each of the plurality of primary GEMS. It should be noted that the information on the allocation of the plurality of discrete fragments among the plurality of primary GEMS are stored in a shard catalog, wherein the catalog keeps track of the plurality of GEMS and are updated frequently for examining current capacity of the plurality of GEMS.

In step 88, the plurality of discrete fragments of the video data are decoded using a streaming server for transmitting the video data to the at least one user.

In one embodiment of the present technique, the method further comprises streaming the video data available to each of the plurality of primary GEMS using a streaming server residing on the GEMS. In another embodiment of the present technique, the method includes transfer of seamless streamed video data to the proxy using a grid node activity tracker (GNAT) by synchronizing the GEMS holding the shards of the video data, installed in each of the plurality of primary GEM. The GNAT is further adapted to monitor dynamic attributes of the plurality of primary GEMS.

It should be noted that the GNAT further comprising distributing the plurality of discrete fragments among the plurality of primary GEMS in replication/mirroring. As indicated earlier, the authentication of the at least one user is done using a proxy. The proxy is further configured to validate and forward request from the at least one user to the scheduler and deliver streamed video data received from GEMS, to the at least one user.

In certain implementation of the present technique, the GNA catalog further helps a scheduler to decide on probable plurality of primary GEMS, which would be required in transmitting the video data requested by the at least one user. It should be noted that the scheduler further comprising caching the plurality of discrete fragments which are frequently used by the at least one user.

In yet another embodiment of the present technique, the method includes facilitating redundancy and content mirroring across the plurality of primary GEMS in the grid infrastructure network using a replicator.

In certain implementation of the present technique, each of the plurality of primary GEMS further comprising a secondary grid enabled mini server (GEMS) configured to receive the plurality of discrete fragments from the corresponding plurality of primary GEMS during failure and overload.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The sequence of instructions as explained in the method steps may include but not limited to, program code adapted for receiving a request from at least one user for viewing the video data and program code adapted for identifying a plurality of attributes from a plurality of primary grid enabled mini servers (GEMS), wherein the plurality of primary GEMS form the grid network.

Further, the method also includes program code adapted for partitioning video data into a plurality of discrete fragments using a shard creator indicative of the plurality of attributes in each of the plurality of primary GEMS and program code adapted for allocating the plurality of discrete fragments among the plurality of primary GEMS based on the plurality of attributes of each of the plurality of primary GEMS. In one embodiment of the present technique, the method steps also includes program code adapted for decoding the plurality of discrete fragments of the video data using a streaming server for transmitting the video data to the at least one user or client.

While, the following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest cope consistent with the principles and features described herein.

Many modifications of the present invention will be apparent to those skilled in the arts to which the present invention applies. Further, it may be desirable to use some of the features of the present invention without the corresponding use of other features.

Accordingly, the foregoing description of the present invention should be considered as merely illustrative of the principles of the present invention and not in limitation thereof.

What we claim is:

1. A method for transmitting a video data over a grid infrastructure network, comprising:
    receiving a request from at least one user for viewing the video data;
    identifying a plurality of attributes that are representative of at least one of network resources and network performance from a plurality of primary grid enabled mini servers (GEMS), wherein the plurality of primary GEMS together form the grid network;
    partitioning the video data into a plurality of shards which are to be contained in the GEMS using a shard creator indicative of the plurality of attributes in each of the plurality of primary GEMS, allotting entities into shards for said primary GEMS based on a difference between sizes of said allotted entities and individual shard capacities of said GEMS, to thereby progressively fit as many entities into shards for a GEM as a shard capacity for each GEM can hold, until all entities are allotted, or if this does not succeed in allotting all of the entities, using a weighted average of the GEM capacities and a size of unallotted entities to iteratively improve the allocation of the entities until all entities are allotted;
    allocating the plurality of shards among the plurality of primary GEMS based on the plurality of attributes of each of the plurality of primary GEMS; and
    decoding the plurality of discrete shards of the video data using a streaming server for transmitting the video data to the at least one user, wherein partitioning the video data into the plurality of discrete entities depends on encoding algorithm and corresponding bit rate.

2. The method as recited in claim 1, wherein information on the allocation of the plurality of shards among the plurality of primary GEMS are stored in a shard catalog, wherein the catalog keeps track of the plurality of GEMS and is updated frequently for examining current capacity of the plurality of GEMS.

3. The method as recited in claim 1, further comprising streaming the video data available to each of the plurality of primary GEMS using the streaming server residing on the GEMS.

4. The method as recited in claim 1, further comprising facilitating redundancy and content mirroring across the plurality of primary GEMS in the grid infrastructure network using a replicator.

5. The method as recited in claim 1, wherein each of the plurality of primary GEMS further comprises a secondary grid enabled mini server (GEMS) configured to receive the plurality of shards from the corresponding plurality of primary GEMS during failure and overload.

6. The method as recited in claim 1, wherein the plurality of primary GEMS are selected from a plurality of devices in the grid infrastructure network.

7. The method as recited in claim 1, wherein the video data comprises audio data.

8. A method for transmitting a video data over a grid infrastructure network, comprising:
    receiving a request from at least one user for viewing the video data;
    identifying a plurality of attributes that are representative of at least one of network resources and network performance from a plurality of primary grid enabled mini servers (GEMS), wherein the plurality of primary GEMS together form the grid network;
    partitioning the video data into a plurality of shards which are to be contained in the GEMS using a shard creator indicative of the plurality of attributes in each of the plurality of primary GEMS, allotting entities into shards for said primary GEMS based on a difference between sizes of said allotted entities and individual shard capacities of said GEMS, to thereby progressively fit as many entities into shards for a GEM as a shard capacity for each GEM can hold, until all entities are allotted, or if this does not succeed in allotting all of the entities, using a weighted average of the GEM capacities and a size of unallotted entities to iteratively improve the allocation of the entities until all entities are allotted;
    allocating the plurality of shards among the plurality of primary GEMS based on the plurality of attributes of each of the plurality of primary GEMS;
    decoding the plurality of discrete shards of the video data using a streaming server for transmitting the video data to the at least one user; and
    transferring seamless streamed video data to a proxy using a grid node activity tracker (GNAT) by synchronizing the GEMS holding the shards of the video data, installed in each of the plurality of primary GEMS.

9. The method as recited in claim 8, wherein the GNAT further comprises distributing the plurality of shards among the plurality of primary GEMS in at least one of replication or mirroring or combinations thereof.

10. The method as recited in claim 8, further comprising authentication of the at least one user using the proxy.

11. The method as recited in claim 8, wherein the proxy is further configured to validate and forward request from the at least one user and deliver streamed video data received from GEMS to the at least one user.

12. The method as recited in claim 8, wherein the GNAT is further adapted to monitor dynamic attributes of the plurality of primary GEMS.

13. A system for transmitting a video data over a grid infrastructure network, comprising:
    a plurality of primary grid enabled mini servers (GEMS), wherein each of the plurality of GEMS comprising at least one attribute which is an indicative of at least one of network resources and performance of at least one node;
    a shard creator configured for partitioning the video data, which comprises one or more entities, into a plurality of shards based on the at least one attribute of any of the plurality of GEMS by allotting said entities into shards for said primary GEMS based on a difference between sizes of said allotted entities and individual shard capacities of said GEMS, to thereby progressively fit as many entities into shards for a GEM as a shard capacity for each GEM can hold, until all entities are allotted, or if this does not succeed in allotting all of the entities, using a weighted average of the GEM capacities and a size of un-allotted entities to iteratively improve the allocation of the entities until all entities are allotted;
    a scheduler configured for allocating the plurality of shards among the plurality of GEMS based on the at least one attribute of each of the plurality of GEMS;
    a shard catalog configured to store information on the allocation of the plurality of shards among the plurality of primary GEMS;
    a proxy configured to validate and forward request from at least one user to the scheduler and deliver streamed video data received from GEMS to the at least one user; and
    a grid node activity tracker (GNAT) installed in each of the plurality of primary GEMS and adapted to transfer seamless streamed video data to the proxy.

14. The system as recited in claim 13, wherein each of the plurality of primary GEMS further comprises a secondary grid enabled mini server (GEM) configured to receive the plurality of discrete fragments from the corresponding plurality of primary GEMS during failure and overload.

15. The system as recited in claim 13, further comprising a grid node attribute (GNA) catalog configured to store information on the at least one attribute of each of the plurality of primary GEMS.

16. The system as recited in claim 15, wherein the GNA catalog further helps the scheduler to decide on probable plurality of primary GEMS, which would be required in transmitting the video data requested by the at least one user.

17. The system as recited in claim 13, wherein the video data comprises audio data.

18. The system as recited in claim 13, further comprising a streaming server installed on every GEMS and configured for streaming the video data available to any of the plurality of primary GEMS.

19. The system as recited in claim 13, wherein the GNAT further comprises distributing the plurality of shards among the plurality of primary GEMS in replication.

20. The system as recited in claim 13, wherein the proxy further comprises authentication of the at least one user.

21. A method for transmitting a video data over a grid infrastructure network, comprising:
    receiving a request from at least one user for viewing the video data;
    identifying a plurality of attributes that are representative of at least one of network resources and network performance from a plurality of primary grid enabled mini servers (GEMS), wherein the plurality of primary GEMS together form the grid network;
    partitioning the video data into a plurality of shards which are to be contained in the GEMS using a shard creator indicative of the plurality of attributes in each of the plurality of primary GEMS, allotting entities into shards for said primary GEMS based on a difference between sizes of said allotted entities and individual shard capacities of said GEMS, to thereby progressively fit as many entities into shards for a GEM as a shard capacity for each GEM can hold, until all entities are allotted, or if this does not succeed in allotting all of the entities, using a weighted average of the GEM capacities and a size of unallotted entities to iteratively improve the allocation of the entities until all entities are allotted;
    allocating the plurality of shards among the plurality of primary GEMS based on the plurality of attributes of each of the plurality of primary GEMS; and
    decoding the plurality of discrete shards of the video data using a streaming server for transmitting the video data to the at least one user, wherein a GNA catalog is adapted to help a scheduler to decide on probable plurality of primary GEMS, which would be required in transmitting the video data requested by the at least one user.

22. The method as recited in claim 21, wherein the scheduler further comprises caching the plurality of shards which are frequently used by the at least one user.

23. A method of partitioning a video data into a plurality of discrete fragments for transmitting the video data to at least one user in a grid infrastructure network, the method comprising:
    identifying capacity and a plurality of configuration parameters for each of a plurality of primary grid enabled mini servers (GEMS);
    sequentially segregating the video data, which comprises one or more entities, into a plurality of shards based on the capacity and the plurality of configuration parameters for each of the plurality of GEMS;
    allotting said entities into shards for said primary GEMS based on a difference between sizes of said allotted entities and individual shard capacities of said GEMS, to thereby progressively fit as many entities into shards for a GEM as shard capacity for each GEM can hold, until all entities are allotted, or if this does not succeed in allotting all of the entities, using a weighted average of the GEM capacities and a size of un-allotted entities to iteratively improve the allocation of the entities until all entities are allotted;
    allocating each of the plurality of shards among the plurality of primary GEMS until all the plurality of shards are allocated among the plurality of GEMS or until no suitable plurality of primary GEMS is located; and
    identifying at least one unallotted shard and distribute the at least one unallotted shard among the plurality of primary GEMS based on a pre-desired ratio until all the plurality of shards are distributed among the plurality of primary GEMS.

24. The method as recited in claim 23, wherein each of the plurality of shards is allocated in any of the plurality of primary GEMS based on the capacity and the plurality of configuration parameters.

25. The method as recited in claim 23, wherein the video data is segregated by matching overall size of video data proportional to the ratio of the capacities of the plurality of primary GEMS.

26. The method as recited in claim 23, further comprising adding a weight factor to the at least one unallotted shard for determining an effective set that distributes proportionally the plurality of shards among the plurality of primary GEMS.

27. A computer-readable medium having stored thereon computer executable instructions for transmitting a video data over a grid infrastructure network, comprising:
  instructions for receiving a request from at least one user for viewing the video data;
  instructions for identifying a plurality of attributes from a plurality of primary grid enabled mini servers (GEMS), wherein the plurality of primary GEMS form the grid network;
  instructions for partitioning video data, comprising one or more entities, into a plurality of shards using a shard creator indicative of the plurality of attributes that are representative of at least one of network resources and network performance in each of the plurality of primary GEMS by allotting said entities into shards for said primary GEMS based on a difference between the sizes of said allotted entities and individual shard capacities of said GEMS, to thereby progressively fit as many entities into shards for a GEM as a shard capacity for each GEM can hold, until all entities are allotted, or if this does not succeed in allotting all of the entities, using a weighted average of the GEM capacities and a size of un-allotted entities to iteratively improve the allocation of the entities until all entities are allotted;
  instructions for allocating the plurality of shards among the plurality of primary GEMS based on the plurality of attributes of each of the plurality of primary GEMS; and
  instructions for decoding the plurality of shards of the video data using a streaming server for transmitting the video data to the at least one user; and
  instructions for seamless streamed video data transfer to the proxy using a grid node activity tracker (GNAT) installed in each of the plurality of primary GEMS.

28. The tangible computer-readable medium as recited in claim 27, further comprising streaming the video data available to each of the plurality of primary GEMS using a streaming server.

29. The tangible computer-readable medium as recited in claim 27, wherein partitioning video data into the plurality of shards depends on encoding algorithm and corresponding bit rate.

30. The tangible computer-readable medium as recited in claim 27, wherein the GNAT further comprises distributing the plurality of shards among the plurality of primary GEMS.

* * * * *